Patented May 20, 1924.

1,494,435

UNITED STATES PATENT OFFICE.

JACOB GOODALE LIPMAN, OF NEW BRUNSWICK, NEW JERSEY.

METHOD AND MEANS FOR PRODUCING SULPHOFYING BACTERIA.

No Drawing.    Application filed March 18, 1922.   Serial No. 544,948.

*To all whom it may concern:*

Be it known that I, JACOB G. LIPMAN, a citizen of the United States of America, residing at New Brunswick, in the county of Middlesex and State of New Jersey, have invented certain new and useful Improvements in Methods and Means for Producing Sulphofying Bacteria, of which the following is a full, clear, and exact description.

This invention relates to sulphofying or sulfur-oxidizing organisms. More specifically it relates to methods of producing or isolating such organisms, and to the culture mediums and methods of producing the same.

Among other objects, the invention has for its object to provide novel culture mediums and methods of producing the same and novel methods of producing the sulfur-oxidizing organisms in the desired state of isolation.

In my copending application Serial No. 352,861 filed January 20, 1920, "sulfur-oxidizing organisms and methods of producing the same", I disclosed a method of isolating sulfur-oxidizing bacteria, this method being described as follows.

Sulfur is added to fertile soil and the material is kept moist and stirred from time to time for a period of ten weeks or more. A small quantity of this material is then added to a suitable culture medium and the bacteria allowed to develop. The culture is then purified by any suitable method, such as the plate method commonly employed in bacteriological laboratories or by the dilution method, preferably the latter.

The culture medium and method of producing or preparing the same, as disclosed in my companion application Ser. No. 352,861, may be described as follows. An agent capable of metabolizing the organisms (i. e., mineral salts for the metabolism of the organisms), a carbohydrate and a suitable source of nitrogen are dissolved in distilled water. If desirable, calcium carbonate or tricalcic phosphate may be added. The medium is then sterilized in the usual manner. Elementary powdered flour of sulfur is then sterilized in a suitable manner as by placing it in sterilized closed containers and sterilizing it at a temperature of 65 to 70 degrees centigrade for about 24 hours. The sulfur so sterilized is added to the sterile culture medium previously described resulting in the complete medium for the growth of the sulfur-oxidizing organisms. Another method of sterilization is to mix all the ingredients, sulfur included, and to sterilize in flowing steam for three days one half an hour each day.

Without attempting to define all of the substances available it may be stated that the metabolizing agent referred to above may consist of minerals such as those containing magnesium, phosphorus, iron and potassium in the proper amounts. Dextrose or sucrose may be employed as the carbohydrate and sodium nitrate or nitrite as the source of nitrogen. The substances specifically set forth above may be employed in the following proportions:

| | |
|---|---|
| Magnesium chloride | .01 to .1%. |
| Dipotassium phosphate | .05 to .5%. |
| Ferric chloride | One or two drops of a 10% solution per liter of culture medium. |
| Dextrose | .5 to 1.5% |
| Sodium nitrate | .1 to 1.0%. |
| Elementary sulfur | 1.0%. |

As stated in my copending application, the materials and proportions thereof may be varied. For example, where tricalcic phosphate is added no dipotassium phosphate is needed and potassium nitrate may be employed instead of sodium nitrate. When calcium carbonate or tricalcic phosphate is added the amounts may vary from .1 to .5%.

Besides the organism above described I have succeeded in isolating organisms of a different group. These last mentioned organisms are small non-motile rods, autotrophic and can derive their energy from the oxidation of sulfur. They differ, from the organisms disclosed in my copending application and above described, in that they will oxidize thiosulplates without the production of a pellicle and will produce a much greater degree of acidity in the medium than any of the sulfur oxidizing species hitherto described. They can derive their energy from the oxidation of sulfur, their carbon from carbon dioxide and nitrogen from ammonium salts or nitrate. Their activities are not stopped until the hydrogen-ion concentration of the medium is down to an equivalent of $PH = 0.6$. In order to isolate these organisms in pure culture and to grow them to advantage I preferably employ a method which favors the growth of this species and at the same time prevents or impedes the development of other bacteria to any considerable extent. To attain this object I employ a mineral culture medium with sulfur (either in the form of elementary sulfur or sulfur in combination) as the only or chief source of energy, and by adjusting the initial reaction to a PH of 3.0 to 4.0. In isolating these organisms even a more acid medium may be employed (PH=2.0) which will entirely prevent the development of any other organism than the one desired. For convenience I shall hereinafter refer to the organisms described in my copending application and in the first of part of the present specification as Group A, and the organisms latterly described as Group B.

I shall now proceed to describe in greater detail some of the forms of culture media now preferred in the production or isolation of the Group B organisms. One such culture medium may consist of:

| | |
|---|---|
| (NH$_4$)$_2$SO$_4$ | 2.0 gms. |
| KH$_2$PO$_4$ | 3.0 gms. |
| MgSO$_4$ | 0.5 gms. |
| CaCl$_2$ | 0.25 gms. |
| FeSO$_4$ | 0.01 gms. |
| Sulfur, elementary | 10.0 gms. |
| Distilled water | 1000 c. c. |

This medium may be modified by substituting 2.5 grams of Ca$_3$(PO$_4$)$_2$ for the CaCl$_2$, and introducing enough phosphoric acid to establish a reaction of PH 3.0 to 4.6. It will be understood that higher or lower hydrogen-ion concentrations may be employed, variations in the proportions of the other salts may be resorted to and other salts which accomplish the same purposes may be employed.

It will be noted that this medium is properly buffered with soluble salts of phosphoric acid, or the acid itself, or both, or other acid salts and acids which will give a hydrogen-ion concentration equivalent preferably about PH 3.0 to 4.0. The buffer has for one of its objects to prevent too rapid accumulation of acid which results from the oxidation of the sulfur and depresses the activities of the organisms.

Other culture media free from organic matter may be employed in the production or isolation of the Group B organisms, For example instead of employing sulfur in the elemental form, sulfur in the form of a sulfur compound may be employed. Furthermore a solid culture medium may be employed. Such a medium may have the following composition:

| | |
|---|---|
| Sodium thio sulfate (Na$_2$S$_2$O$_3$5H$_2$O) | 5 gms. |
| NH$_4$Cl | 0.1 gms. |
| MgCl$_2$ | 0.1 gms. |
| (CaCl$_2$) | 0.25 gms. |
| or | |
| (Ca$_3$(PO$_4$)$_2$ | 10.0 gms. |
| KH$_2$PO$_4$ | 3 gms. |
| Agar | 20 gms. |
| Distilled water | 1000 c. c. |

The agar contains the iron compound in sufficient quantity so that none additional need be employed.

It will be understood that the culture mediums above described in connection with both Groups A and B may be prepared in substantially the same way except that different ingredients are employed. They are all similar to the extent that they all contain certain ingredients such as a metabolizing agent or agents, soluble iron compounds, a source of nitrogen, and sulfurs either in elemental or compound form. However whereas organic ingredients are employed as a part of the Group A medium, the Group B medium is free from organic matter. The method of inoculating the Group B culture medium or mediums may be substantially the same as that above described in connection with Group A.

It will be noted that certain of the appended claims are generic to the methods of producing sulfur-oxidizing bacteria of both Groups A and B. Certain other claims are generic to the method of producing the culture mediums and to the culture mediums of both Groups A and B. Certain of the other claims are specific to the Group B culture medium and methods relating thereto. Claims specific to the Group A organisms and methods relating thereto will be found in my copending application above cited, or a renewal thereof.

The sulfur organism produced by any of the processes above referred to and described has the ability, when growing in pure culture and in a suitable medium, to oxidize elementary sulfur to sulfuric acid which may be employed for a variety of purposes. Thus the sulfuric acid so produced may be concentrated and used for various technical purposes. It may be used to treat phosphate rock to produce soluble phosphates. By treating green-sand marl and other potash-bearing minerals with it, soluble potash fertilizers may be produced. Black alkali may be converted to white alkali by means of its use, and so-called alkali soils thereby reclaimed. It may be used for supplying sulfates to crops in regions where the natural soil supply is inadequate. It may also be employed to check the development of scab on potato tuber or for destroying noxious vegetation, insects or organisms.

What I claim is:—

1. A culture medium for sulfur-oxidizing bacteria, which medium comprises a metabolizing agent, a soluble iron compound, a source of nitrogen and sulfur.

2. A culture medium for sulfur-oxidizing bacteria, which medium comprises metabolizing minerals, a soluble iron salt, a compound containing nitrogen, and sulfur.

3. A culture medium for sulfur-oxidizing bacteria, which medium comprises a phosphate, a nitrogen compound, a soluble iron compound, and sulfur.

4. The method of preparing a culture medium for sulfur-oxidizing bacteria, which method comprises forming a mixture containing a metabolizing mineral, a soluble iron salt and a nitrogen compound, sterilizing the mixture, and adding sterilized sulfur.

5. The method of preparing a culture medium for sulfur-oxidizing bacteria, which method comprises forming a solution containing metabolizing minerals, and iron salt and a nitrogen compound, sterilizing the solution, and adding sterilized sulfur.

6. The method of producing sulfur-oxidizing bacteria which comprises mixing sulfur with fertile soil, and adding the mixture to a culture medium including a metabolizing agent, a soluble iron compound, a source of nitrogen, and sulfur.

7. The method of producing sulfur-oxidizing bacteria which comprises mixing sulfur with fertile soil, and adding the mixture to a culture medium including metabolizing minerals, a soluble iron salt, a compound containing nitrogen, and sulfur.

8. The method of producing sulfur-oxidizing bacteria which comprises mixing sulfur with fertile soil, and adding the mixture to a culture medium including a phosphate, a nitrogen compound, a soluble iron compound, and sulfur.

9. The method of producing sulfur-oxidizing bacteria which comprises forming a mixture containing a metabolizing mineral, a soluble iron salt and a nitrogen compound, sterilizing the mixture, adding sterilized sulfur, forming a mixture of sulfur and fertile soil, and combining the two mixtures.

10. The method of producing sulfur-oxidizing bacteria which comprises forming a solution containing metabolizing minerals, an iron salt and a nitrogen compound, sterilizing the solution, adding sterilized sulfur, forming a mixture of sulfur and fertile soil, and combining the solution and mixture.

11. A culture medium for sulphofying bacteria, said medium consisting entirely of inorganic substances and containing a metabolizing agent and sulfur.

12. A culture medium for sulphofying bacteria, said medium consisting entirely of inorganic substances and containing a metabolizing agent, a source of nitrogen, and sulfur.

13. A culture medium for sulphofying bacteria, said medium consisting entirely of inorganic substances and containing a metabolizing agent, a soluble iron compound, a source of nitrogen, and sulfur.

14. The method of producing sulphofying bacteria which comprises mixing sulfur with fertile soil, and adding the mixture to a culture medium having the composition specified in claim 11.

15. The method of producing sulphofying bacteria which comprises mixing sulfur with fertile soil, and adding the mixture to a culture medium containing sulfur and a buffering agent which is soluble by the action of the sulfuric acid produced from the sulfur by the action of the sulphofying bacteria.

16. A culture medium for sulphofying bacteria, said medium consisting entirely of inorganic substances and comprising a source of energy including sulfur, and a solid buffering agent which is soluble by the action of sulfuric acid produced from sulfur by the action of sulphofying bacteria.

17. The method of reclaiming black alkali soil which comprises adding inoculated sulfur to said soil to convert black alkali to white alkali.

18. The method of reclaiming black alkali soil which comprises adding a medium containing sulphofying bacteria to said soil to convert black alkali to white alkali.

19. The method of producing sulphofying bacteria which comprises mixing sulfur with fertile soil, and adding the mixture to a culture medium having the composition specified in claim 12.

20. The method of producing sulphofying bacteria which comprises mixing sulfur with fertile soil, and adding the mixture to a culture medium having the composition specified in claim 13.

21. The method of preparing a culture medium for sulfur-oxidizing bacteria which method comprises forming a mixture containing sulfur as the source of energy and a buffering agent capable of giving a hydrogen-ion concentration equivalent to about PH 2.0 to 6.6.

22. The method set forth in claim 21 in which the buffering agent includes a compound containing a phosphoric acid radical.

23. The method set forth in claim 21 in which the buffering agent includes a soluble salt of phosphoric acid.

In testimony whereof I hereto affix my signature.

JACOB GOODALE LIPMAN.